INVENTORS
ELDRED H. PAUFVE &
WILLIAM C. EBELING
BY

United States Patent Office 3,439,105
Patented Apr. 15, 1969

3,439,105
VISUAL DISPLAY SYSTEM
William C. Ebeling, Binghamton, N.Y., and Eldred H. Paufve, Susquehanna, Pa., assignors to Singer-General Precision, Inc., a corporation of Delaware
Filed Mar. 24, 1965, Ser. No. 442,392
Int. Cl. G09b 29/00
U.S. Cl. 35—10.2          17 Claims

ABSTRACT OF THE DISCLOSURE

The disclosed embodiment of the invention is a visual display system which employs a pair of transparencies, simultaneously scanned from a flying spot scanner, one of which is a rectified aerial photograph of an area and the other of which is an elevation map of the same area. Video luminance information derived from scanning the aerial photograph is applied to a display cathode ray tube, the sweep operation of which is varied in accordance with elevation information derived from scanning the elevational map. A shadow computer disconnects the video signal and the vertical sweep signal from the CRT when the terrain being scanned at any given instant has a change in elevation such that the terrain could not be seen by any observer located at the instantaneous simulated aircraft altitude.

---

This invention relates to visual display systems, and more particularly, to an improved visual display system for use with aircraft simulators and the like. A variety of visual display systems have been employed in the prior art to present pilot and other aircraft operating personnel with views of simulated terrain. For realistic training, it is important that the scenes presented to a student in a simulator be as "unprogrammed" as possible, i.e., that the scenes vary realistically, in accordance with the student's operation of the simulator controls.

One well known prior art visual display system employs a three-dimensional scale model of the terrain to be displayed. The scale model is viewed by the pick-up camera of a closed-circuit television system, and the scene viewed by the camera is projected by a conventional TV projector onto a screen to be viewed by the student. The television camera is moved relative to the scale model as the student "flies" the simulator in the same manner that the actual aircraft would move with respect to actual terrain for the same control movements. While such systems are unprogrammed, they suffer from several disadvantages. Unless very large scale reductions are used, a scale model necessary to simulate the terrain over a flight of any appreciable length must be so large that it is very expensive to construct. On the other hand, if very large scale reductions are employed, it has not been possible to provide sufficient optical resolution to provide a realistic display. And when a large scale reduction is employed, it becomes necessary to locate the camera optical system entrance pupil extremely close to the scale model when low level flight is simulated, which results in severe problems in depth of focus. Because of such problems, such visual display systems have usually been limited to the simulation of only a few miles of terrain surrounding an airfield, and even then the simulation during low altitude flight has been less than satisfactory.

Another form of prior visual display system utilizes a rectified aerial photograph transparency which is scanned by a flying spot scanner to derive a video signal which is displayed to the student by a television projector. Again, the scanner is moved relative to the transparency in accordance with the student's manipulation of the simulator controls. Because a photographic transparency can incorporate only two-dimensional pictorial information, such systems are suitable only for simulation of flight at fairly high altitudes or simulation of flight over extremely flat terrain. Such transparency-scanning systems are preferable to scale model systems in that it is feasible to simulate much larger terrain areas with a transparency, but they are even less realistic for low altitude simulation or variable terrain elevation simulation than the scale model systems. It is highly desirable to be able to provide realistic training for missions at much lower altitudes, and for missions over mountainous and rough terrain.

The present invention enjoys a major advantage over the above-mentioned scale model systems in that much longer flights can be realistically simulated in an economical and practical manner. The present invention has the advantages over prior transparency-scanning systems in that it provides visual displays in proper three-dimensional perspective and can realistically simulate flight over terrain having much more altitude variation than the prior art.

In a preferred embodiment of the present invention a flying spot scanner (FSS) simultaneously scans related portions of two transparencies, one of which is a rectified aerial photograph of an area and the other of which is an evaluation map of the same area. Either or both of the transparencies may be monochromatic or polychromatic. Video luminance information derived from scanning the aerial photograph is applied to a display cathode-ray tube. The sweep operation of which is varied in accordance with elevation information derived from the scanning of the elevation map, thereby to provide a display which realistically incorporates three-dimensional or relief effects in proper perspective. Because of the great bandwidth of the elevation information, it is desirable that at least one of the display tube sweep circuits have large bandwidth, which, in the present state-of-the-art in general, requires electrostatic deflection. Because cathode-ray tubes with electrostatic deflection are usually not large or bright enough to provide the desired final display, an electrostatic deflection cathode-ray tube may be used to produce an intermediate display. The intermediate display then may be transmitted through a conventional closed-circuit television system by means of a TV camera viewing the display to a screen, for observation by students within a simulator through the cockpit window.

One alternative embodiment of the invention utilizes a plurality of recording storage tubes, which are frequently termed "scan conversion" tubes, as the intermediate display cathode-ray tubes. Plural separate banks of such storage tubes are used, with one tube provided for each primary color in each bank, and the video luminance signals from successive frames of the flying-spot scanner are applied alternately or in sequence to the separate banks of storage tubes. The video signals are then read out of the storage tubes in sequence and applied to a final display cathode-ray tube. The read-out signals controlling the storage tubes are derived from the closed-circuit TV sweep system, so that video information may be applied to the storage tubes at a slow rate amenable to computation, and read out of the tubes at a faster rate to provide a flickerless display. Other embodiments of the invention may use ordinary cathode-ray tubes as the intermediate display tubes.

Thus it is a primary object of the present invention to provide a realistic visual display simulating a terrain in which terrain changes are shown in realistic three-dimensional perspective.

It is another object of the invention to provide a realistic visual display which may be readily produced in color One important object of the invention is to provide a visual display which allows simulation of travel over a very large territory with improved resolution.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 6 is an electrical schematic diagram illustrating one form of sweep generator which may be used at the $r$ sweep generator of FIGS. 4 and 5a;

FIG. 8 is an electrical schematic diagram illustrating one form of intermediate storage device which may be used in embodiments of the invention following the principles of FIG. 4a;

Elevation data preferably is coded on the elevation film in terms of density and/or color. For example, eight different discrete shades of red may be used, with one shade representing an elevation of 1,600 feet above an arbitrary reference level, a second shade representing an elevation of 3,200 feet, and so forth with the darkest (or, if desired, the lightest) eighth shade of red representing an elevation of 12,800 feet. Eight different shades of green may be used, each representing a difference of elevation of 200 feet from the next shade, and ten shades of blue may be used, each representing an elevation difference of 20 feet. Thus it will be seen that by selection of a particular shade of each one of the three colors, one may code any elevation between zero and 14,600 feet within an accuracy of plus or minus 10 feet. It will become apparent that more than three (or less than three) colors may be used in various embodiments of the invention, and that different numbers of shades of a given color may be used. In one alternative arrangement, only one transparency is used, with luminance encoded in one color and elevation encoded in a different color.

In a simplified embodiment of the invention, the above-mentioned color elevation transparency may be replaced by a monochrome transparency on which elevation information is stored solely in terms of gray-scale density graduations on the film. Similarly, a monochrome rectified aerial photograph may be used to provide suitable terrain luminance information for a black and white final display. As in any TV presentation, however, a full color display provides a more realistic image to the viewer.

In a third still simpler system, the elevation transparency, whether black-and-white or color, is used alone to produce a computed image of terrain information. This third display does not portray any vegetation, culture features, or water body information, but does present a well-simulated representative terrain with variations in image brightness. In any embodiment of the invention, video enhancement and blanking may be incorporated to achieve proper highlight and shadow effects, and horizon and sky effects may be added to the final display synthetically for added realism.

Figure 3:
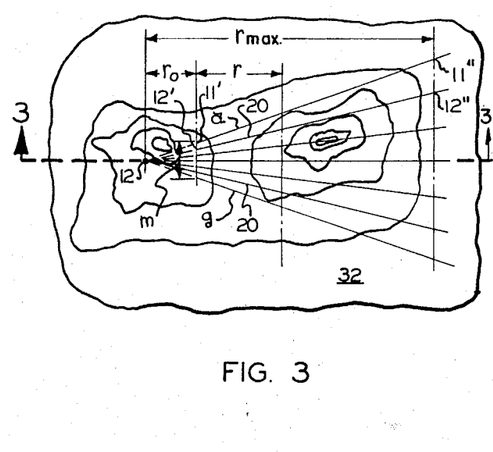
FIG. 3 shows a portion of a transparency which is scanned with an exemplary trapezoidal scanning raster.

FIG. 3 is a plan view showing a number of scan lines 20, 20 across an elevation transparency 32, and it will be understood that a luminance transparency may be scanned similarly and in synchronism with corresponding scan lines. The scan lines 20 of FIG. 3 extend radially outwardly from point 12, which represents the observer's position. Only a few scan lines are shown in FIG. 3, and they are shown with exaggerated separation for sake of clarity. The scan lines are lettered $a$ through $g$ in FIG. 3. In order to produce an out-the-window display for most training purposes it is generally unnecessary to display terrain immediately below the pilot's viewpoint, and frequently the transparency need not be scanned along the portions of lines 20 which are nearer to viewpoint 12 than the distance $r_0$ shown in FIG. 3. The scan lines are terminated at a selected distance $r_{max}$ representing an arbitrarily selected far limit of vision, such as 10 or 20 miles, for example. Scan line 20a is scanned first, progressing from point 11' out to point 11''. Then adjacent scan line 20b is scanned, from point 12' to point 12'', and so forth. Thus it will be seen that each transparency is scanned with a trapezoidal scanning raster. It should be recognized that use of a trapezoidal scanning raster is not an absolute requirement, and that other types of rasters may be employed. A trapezoidal raster of the type described is particularly useful, however for provision of an out-the-window type of visual presentation, and is much easier to implement than many other types of rasters which conceivably might be employed.

Figure 1:
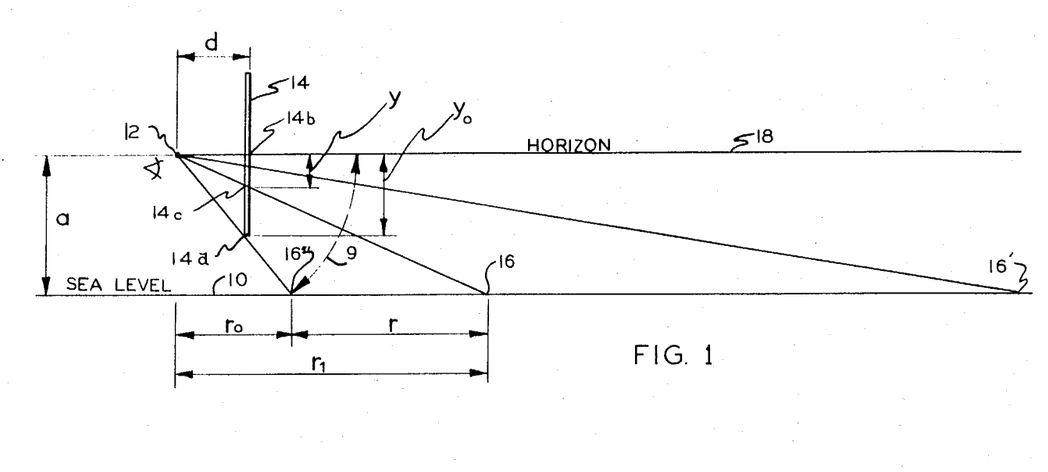
FIGS. 1 and 2 are geometrical diagrams illustrating basic spatial relationships between an observer's viewpoint and terrain being viewed.
Figure 2:
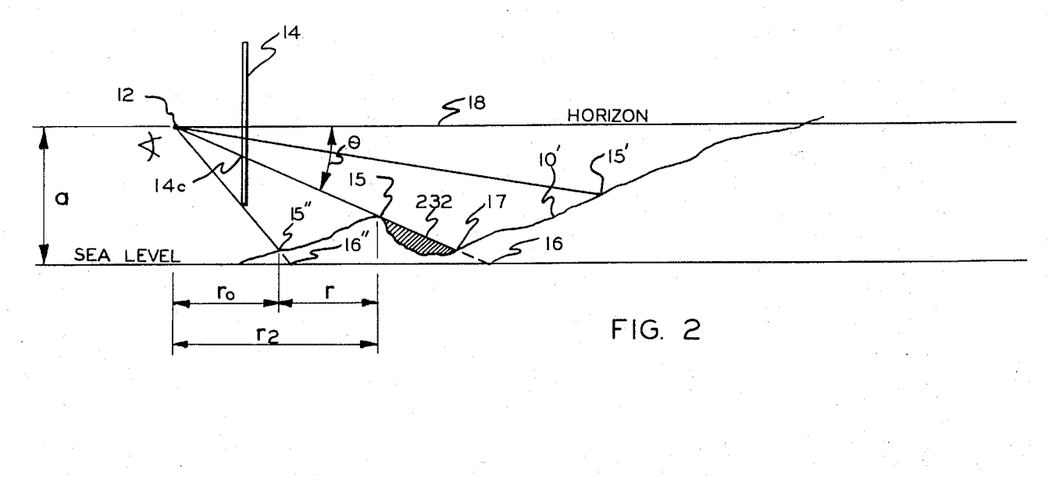

FIGS. 1 and 2 each are elevation views taken at lines 3—3 in FIG. 3, with FIG. 1 assuming that the terrain to be simulated is flat and with FIG. 2 assuming that the terrain has variations in elevation.

In the elevation view of FIG. 1, the viewpoint 12 of an observer at altitude $a$ above a flat terrain 10 observes the terrain generally downwardly and ahead of him. It will be apparent that the actual scene encompassed by angle 9 may be simulated by providing a proper simulated display on screen 14, which is located at a horizontal distance $d$ from the observer's viewpoint. By projecting each point of the actual scene back to viewpoint 12, it will be seen that a proper display on screen 14 to simulate the actual scene encompassed by angle 9 will extend from the bottom edge 14a of the screen up to an upper point 14b on the screen where horizon line 18 intersects the screen. It will be seen that the point 14c of the simulated display representing point 16 on the actual terrain should be located at a distance $y$ down from point 14b where horizon line 18 intersects the screen. Point 16 is shown located at a horizontal distance $r_1$ from the observer's viewpoint 12. It will be seen from similar triangles that:

$$d/y = r_1/a$$

or $$d/y_0 = r_0/a \qquad (1)$$

and $$y = ad/r_1$$

or $$y_0 = ad/r_0 \qquad (2)$$

It will be seen from Expression 2, and will be apparent from FIG. 1, that the vertical distance between the horizon line and any given point in the picture to be projected on screen 14 varies inversely in accordance with the horizontal distance $r$ and directly with the altitude distance $a$ between the viewpoint 12 and the actual point on terrain 10.

Assume now that the picture required on screen 14 to simulate terrain 10 is to be produced by projecting a dot of light on screen 14, with the dot of light moving at a uniform speed of $k$ units per second, beginning at bottom edge 14$a$ at vertical distance $y_0$ and proceeding upwardly to the horizon point 14$b$ where $y=0$. The instantaneous value of the vertical position $y$ of the dot below the horizon point 14$b$ will be seen to be:

$$y(t) = y_0 - kt \tag{3}$$

The instantaneous ground range $r_1$ of the actual terrain point being represented by the dot of light at any instant will be seen to be:

$$r_1(t) = r_0 + r(t) \tag{4}$$

If the light spot of a flying spot scanner is moved in accordance with Expression 4 to illuminate successive points on a transparency to provide video signals, and if the video signals are displayed on a cathode ray tube screen at 14 by means of a vertical sweep of constant speed $k$, it will be seen that a replica of the scene viewed by the observer will be provided. In order to properly sweep the flying spot scanner across the transparency, however, it is necessary to compute the ground range of the terrain point being simulated during each instant of each upward sweep of the display cathode ray tube beam. In a given installation it will be apparent that the screen distance $d$ is fixed, and that altitude changes so slightly, if at all, during the provision of a single frame of a television-type display, that the quantity $a$ may be regarded as a constant insofar as a single sweep waveform is concerned.

Rearranging Equation 1

$$r_1 = ad/y \tag{5}$$

Substituting the instantaneous values of $r_1$ and $y$ from Equations 3 and 4 into Equation 5:

$$r_0 + r(t) = \frac{ad}{(y_0 - kt)} \tag{6}$$

$$r(t) = \frac{ad}{(y_0 - kt)} - r_0$$

Recognizing from FIG. 1 that $r_0 = ad/y_0$ and substituting for $r_0$ in Expression 6

$$r(t) = \frac{ad}{y_0} kt - \frac{ad}{y_0}$$

Multiplying through by $y_0(y_0 - kt)$:

$$r(t)[y_0][y_0 - kt] = ady_0 - ad[y_0 - kt] -$$

$$d_0 - = ad[kt]r(t) = \frac{adkt}{y_0(y_0 - kt)} \tag{7}$$

If Expression 7 is plotted it will be seen that $r$ increases exponentially with time, beginning at zero when $t=$zero and going to infinity when $kt$ equals $y_0$. When the dot of light began its upward sweep (at $t=0$) in the above analysis, it should be noted that the ground range of the point 16″ of actual terrain being simulated was not zero, but instead $r_0$.

By similar manipulation one may relate instantaneous dot position $y(t)$ to ground range and time by the following expression:

$$y(t) = y_0 - kt = \frac{ad}{r_0 + r(t)} \tag{7a}$$

It can be shown that a value of $r$ in accordance with Expression 7 can be provided by solution of the following differential equation:

$$\frac{y_0}{K}\dot{r}(t) - 2r(t) - \frac{y_0}{ad}r^2(t) = \frac{ad}{y_0}$$

where $$\dot{r} = \frac{d}{dt}r(t)$$

Solving for $r(t)$ one obtains $$r(t) = \int \dot{r}(t)dt = \frac{k}{d}\int \left[\frac{1}{a}r^2(t) + 2\frac{d}{y_0}r(t) + a\left(\frac{d}{y_0}\right)^2\right]dt \tag{8}$$

and $$r_1(t) = r_0 + r(t) = \frac{ad}{y_0} + r(t)$$

Apparatus for continuously computing the quantity $r$ to control the sweep of the flying spot across the two transparencies is shown and described in connection with FIGS. 4, 5$a$ and 6. The video luminance information derived from scanning the luminance transparency is processed in various ways to be described and then reconstituted into a picture on a cathode ray tube.

The above analysis based on FIG. 1 assumed that the terrain to be simulated was absolutely flat, and Equations 1–8 do not include any variable representing terrain elevation changes such as those exhibited by terrain 10′ in FIG. 2. When terrain having elevation changes is to be simulated, some of the expressions derived in connection with FIG. 1 must be modified. It will be seen that while the intensity of a spot of light at point 14$c$ in FIG. 1 represents the luminance of terrain at ground range $r_1$ in FIG. 1, the intensity of a spot at point 14$c$ must represent the luminance of terrain at the lesser ground range $r_2$ in FIG. 2, and hence the transparency scanning sweep speed must be slowed down relative to the speed of the display beam of light on screen 14 for increases in terrain elevation, and speeded up for decreases in terrain elevation. In the invention, the effect of elevation changes is provided at the time the luminance video information is reconstituted by varying the sweep speed of the cathode ray tube used to provide the display. Equation 7$a$, which (for a fixed valve of $d$) specified the position of the dot of light on screen 14 in terms of altitude $a$, range $[r_0+r(t)]$, and time $t$, can be rewritten merely substituting $(a-h)$ for $a$, to provide the following expression:

$$y(t) = \frac{(a-h)d}{r_0 + r(t)} = \frac{ad}{r_0 + r(t)}\left[1 - \frac{h}{a}\right] \tag{9}$$

where $h$ is the instantaneous height above the reference level of the point of terrain being simulated at any instant. By comparing Equation 7$a$ with Equation 9, it may be seen that one need merely modify the uniform speed sweep assumed in the derivation of Equation 7$a$ by the factor $$\left(1 - \frac{h}{a}\right)$$

in order to provide the effect of elevation changes, or three-dimensional perspective, in the final displayed scene. And as will be explained in more detail below, the video signals derived from scanning the transparency may be blanked out when shadow portions such as the area shown at 232 in FIG. 2 are scanned.

It may be noted that the equations derived above are all based upon the assumption that the plane (screen 14) of the final image display is vertical with respect to the earth, which serves to simplify the equations but which is not an absolute requirement. Further, the equations are also based on an assumption that the vertical sweep on screen 14 moved at a uniform speed, which also is not an absolute requirement. As will be explained below, other systems using nonvertical final image planes are also within the scope of the invention, and it is deemed worthwhile to mention at this point that proper perspective in the simulated display depends upon the ratios between the input (scanner) sweeps and the sweeps used to reconstitute an image rather than depending on the individual sweeps themselves. Thus, while this application illustrates the use of an exponential sweep $r(t)$ on the scanner and a uniform linear sweep ($y_0-kt$) on the display, it is within the scope of the invention to use other combinations of sweeps, the ratios between which constitute the same non-linear function. In general it is desirable that one or the other sweeps be linear, as gain control circuits are usually required to eliminate intensity variations which result from the use of nonuniform sweep velocities.

Figures 4, 4A:
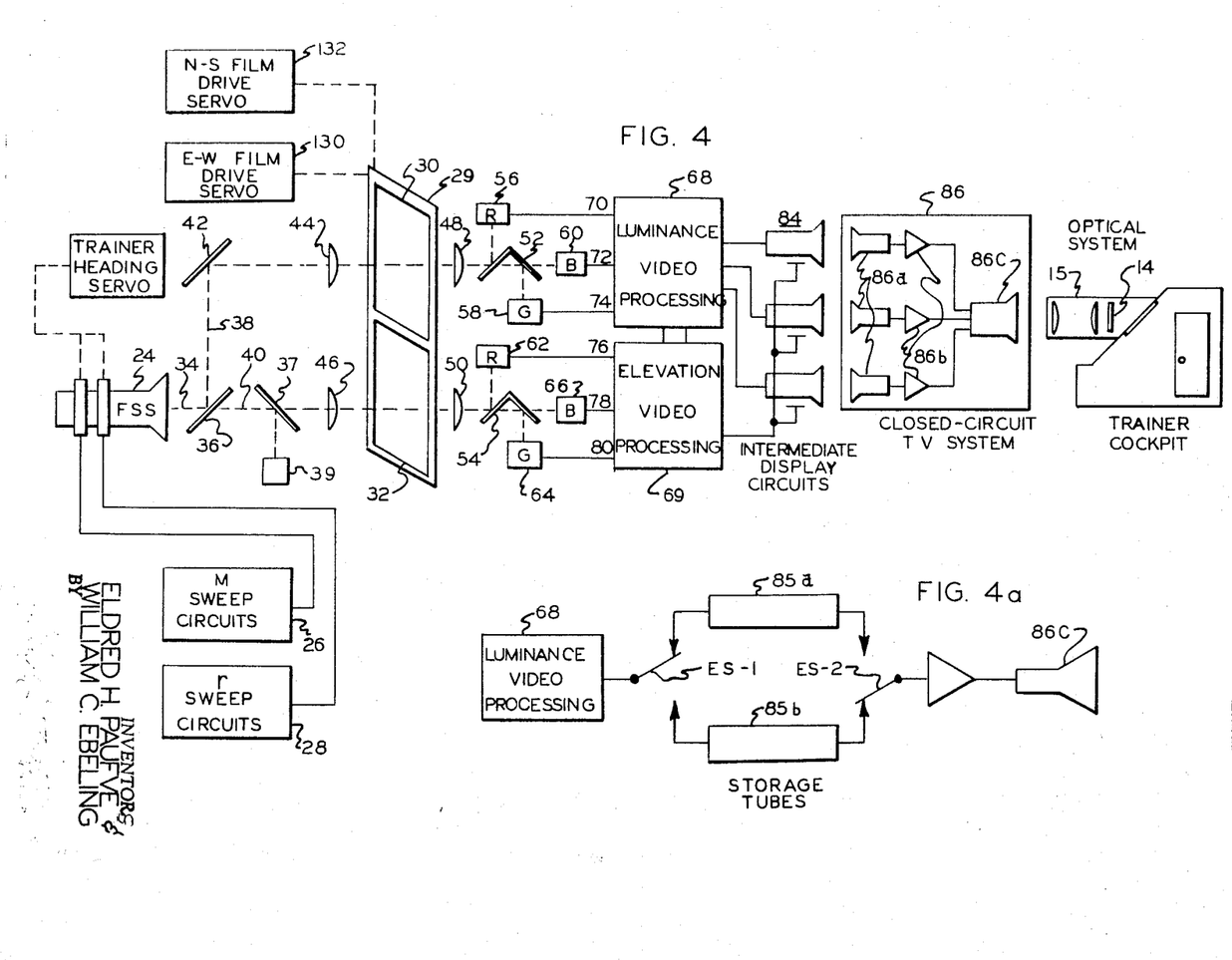
FIG. 4 is a block diagram of a preferred embodiment of the invention.
FIG. 4a is a block diagram illustrating a portion of one alternative embodiment of the invention.

FIG. 4 illustrates a preferred form of the invention in schematic form, with many portions shown in block diagram form for sake of clarity. A flying-spot scanner 24 driven by $m$ and $r$ sweep waveforms from sweep computer circuits 26 and 28 synchronously scans similar trapezoidal areas on both a rectified color aerial photographic transparency 30 and an elevation transparency 32, both of which are mounted on a film plate 29 which is positioned with respect to the flying spot scanner in two coordinate directions by E-W and N-S film drive servos 130 and 132. The $r$ sweep computer 28 repetitively computes the exponential range quantity $r_1(t)$ to govern the radial excursion of each scan line, and the $m$ sweep computer circuit 26 controls the angles of the successive scan lines which form the trapezoidal raster. Both of these sweep computers are explained below in greater detail.

The light beam 34 from the flying spot scanner, or FSS, is directed toward a beam splitter or half-silvered mirror 36 which splits beam 34 into a pair of beams 38 and 40, beam 38 being reflected and beam 40 being transmitted. Beam 38 is redirected by mirror 42 and focused by lens 44 upon luminance transparency 30. Beam 40 is directed toward a further beam splitter 37. The portion of beam 40 transmitted by beam splitter 37 is focused by lens 46 upon elevation transparency 32. The portion of beam 40 reflected by beam splitter 37 is directed to photosensor 39. The output of photosensor 39 may be employed, if desired, to cancel out intensity variations by controlling the output of the color photosensors in accordance with the output of monitor photosensor 39 in a manner described in detail in U.S. Patent No. 3,031,774.

The beams applied to films 30 and 32 are modulated both in color and intensity in accordance with the data encoded on the films. The modulated beams are collected by field lenses 48 and 50 and each separated into the primary colors red, green and blue by double-dichoric mirrors 52 and 54, each surface of the mirrors reflecting light of certain colors while passing other colors. The three different color beams reflected from mirror 52 are sensed by reflectance photosensors 56, 58 and 60 which detect the amount of red, green and blue, respectively, in the modulated beam from luminance film 30, and the three different color beams reflected from mirror 54 are sensed by photosensors 62, 64 and 66, which detect the amounts of red, green and blue, respectively, in the modulated beam from elevation film 32.

The output signals from luminance photosensors (56, 58, 60) are applied to luminance video processing circuits indicated collectively as block 68 in FIG. 4. The luminance video processing circuits 68 amplify the luminance video signals, substitute artificially-generated "sky" signals at appropriate times, and blank off the luminance video signals at appropriate times. The output signals from the luminance video processing circuits are then applied to the intensity grid circuits of three cathode ray tubes 84a, 84b and 84c termed the "intermediate display" CRT's. The elevation video signals from elevation photosensors 62, 64 and 66 are applied to elevation video processing circuits 69 which control the vertical deflection circuit of the intermediate display tubes and also provide blanking and gain control signals to the luminance video processing circuits 68. As mentioned above, the elevation information derived from scanning elevation transparency 32 is used to accelerate or decelerate the sweep rates of intermediate display CRT 84 apparatus in order to provide three-dimensional perspective in the simulated display. The intermediate display provided by CRT 84 apparatus is viewed by a conventional closed-circuit TV system 86 which includes three vidicon cameras 86a, amplifiers 86b, and a projection display tube 86c which provides the final display image on screen 14, through an optical system 15, for observation by one or more students in a flight simulator cockpit, for example.

In a modified embodiment of the inventon partially illustrated in FIG. 4a, alternate frames of the processed luminance video from circuit 68 are applied to each of a pair of recording storage tubes 85a, 85b (frequently termed "scan conversion" tubes) by timed operation of electronic switching means shown for sake of simplicity as a simple mechanical switch ES-1 in FIG. 4a, and while luminance video is being either written into or erased from one of the storage tubes, a further electronic switch ES-2 reads out the video which was previously stored in the other storage tube, and applies the video, via further amplification if necessary, to a final display tube 86c which may correspond to tube 86c of FIG. 4.

Figure 5A:
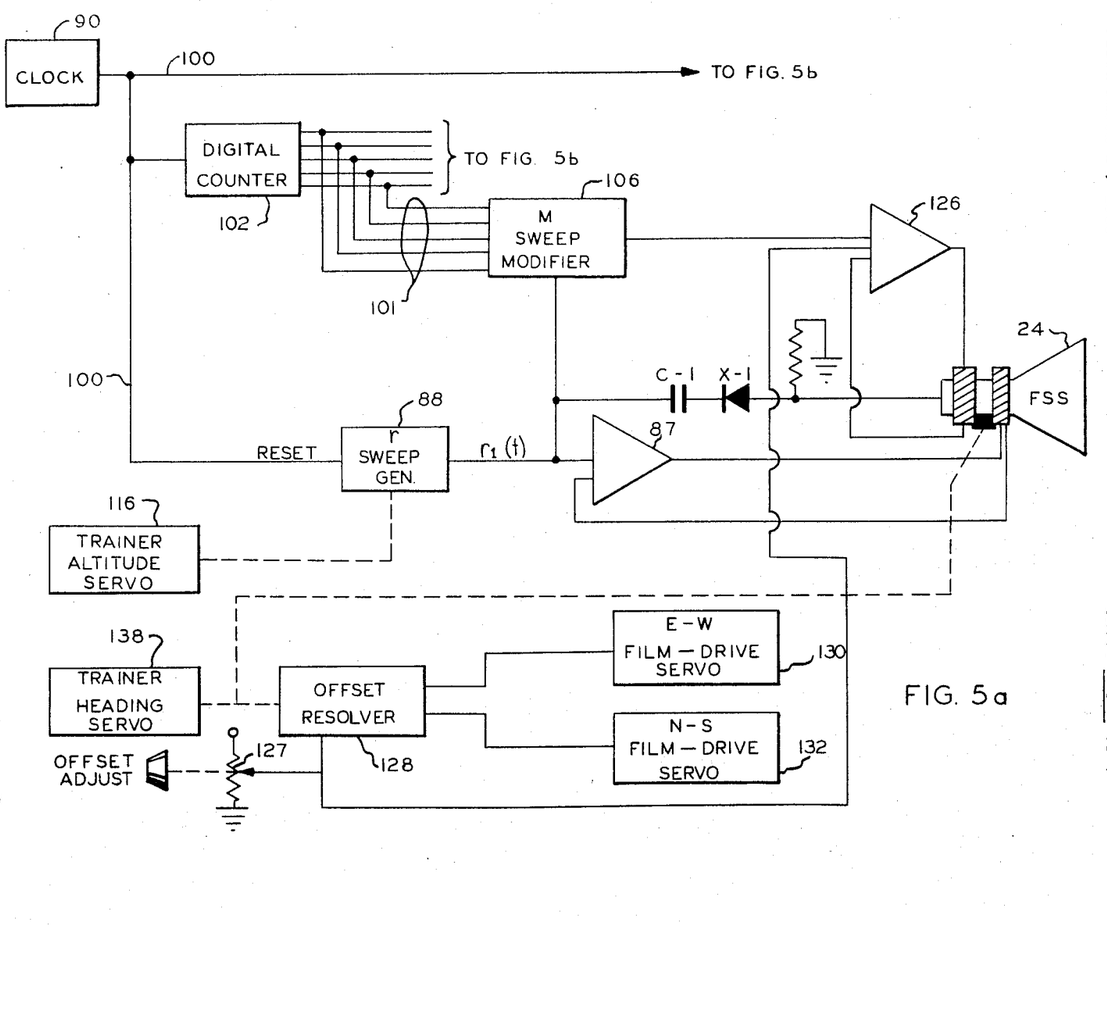
FIG. 5a is an electrical schematic diagram largely in block form illustrating one form of transparency-scanning apparatus which may be used in the invention.
Figure 6:
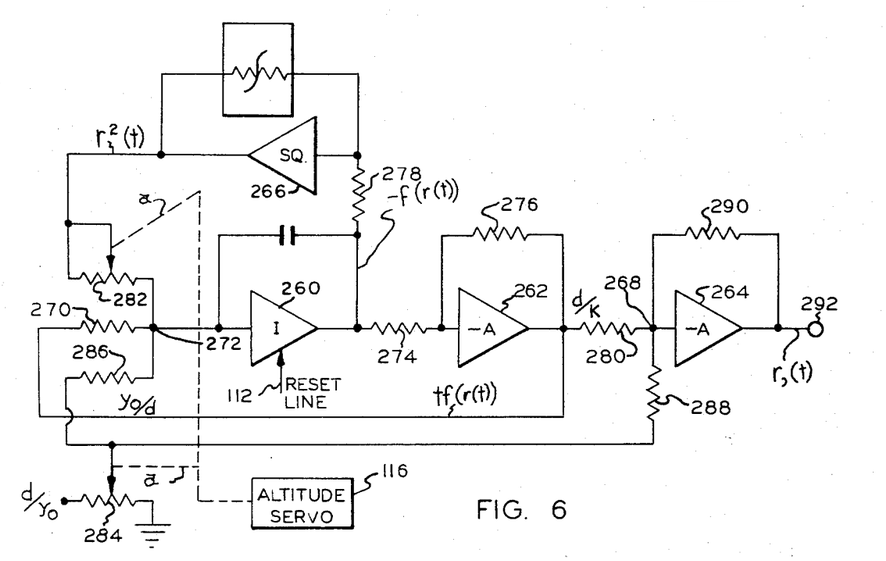

FIG. 5a illustrates in block form one form of suitable apparatus for controlling flying spot scanner 24. A clock pulse source 90, which may comprise any one of a number of conventional oscillator circuits, serves as the basic timing mechanism of the system, and provides clock pulses on its output line 100 at a fixed rate, such as 15,000 pulses per second, for example. The pulses on line 100 are applied to $r$ sweep generator 88, the details of which are explained below in connection with FIG. 6. Each clock pulse causes the $r$ sweep generator to reset to an initial condition and then begin to solve differential Equation 8, providing an exponentially increasing output signal commensurate with the $r_1(t)$ quantity explained above. The $r_1(t)$ output signal from $r$ sweep generator 88 is applied directly via a conventional current driver amplifier 87 to one deflection coil of the flying spot scanner tube 24. The output signal from $r$ sweep generator 88 is also shown applied via capacitor C-1 and diode X-1 to the FSS intensity grid circuit to blank the FSS during the retrace or reset of the $r_1(t)$ sweep waveform.

The output signal from clock 90 is also applied to a conventional recycling digital counter 102 which counts to a number equal to the desired number of scan lines in the trapezoidal scanning raster to be provided on flying spot scanner 24. For example, counter 102 may count from $-500$ up to $+500$ and the $n$ recycle. Each change of count results in a scan line being displaced from the preceding scan line of the trapezoidal array of scan lines shown in FIG. 3. The parallel output count signal from counter 102 is applied via a plurality of wires indicated collectively at 101 to the $m$ sweep modifier circuit 106, the details of which are discussed below in connection with FIG. 7. The $r_1(t)$ output signal from $r$ sweep generator 88 is also supplied to $m$ sweep modifier 106, and during each sweep, modifier circuit 106 multiplies the instantaneous value of the $r_1(t)$ signal by the digital number present in counter 102 during the sweep. By noting that the distance between any two successive scan lines varies proportionally with range, as shown in FIG. 3, it will be appreciated that the output signal from $m$ sweep modifier 106 will provide successive scan lines which are angularly displaced in the manner shown in FIG. 3. The output signal from $m$ sweep modifier 106 is applied via current driver amplifier 126 to the other of the deflection circuits of flying spot scanner 24. In order to utilize more of the face of FSS 24 to provide the trapezoidal scanning raster, the origin of FSS 24 is offset from the center of tube 24 by applying a fixed bias current to one of the deflection circuits. In FIG. 5a such a bias current is shown derived by potentiometer 127 and applied to the $m$ sweep deflection circuit of the flying spot scanner. With the scanner CRT origin displaced from the center of the tube, rotation of the scanner deflection coils about the tube axis with changes in simulated heading will be seen to result in unwanted translations of the raster with respect to the two transparencies. To correct for these unwanted translational displacements the offset voltage from potentiometer 127 is resolved in accordance with simulated landing by a conventional resolver 128 to provide correction signals to the N-S and E-W film drive servos, 132 and 130 respectively. It now will be understood that flying spot scanner 24 provides a trapezoidal scanning raster which is moved across each film transparency in accordance with changes in aircraft position with respect to the terrain, and that the raster angularly turns as simulated aircraft heading changes, due to the rotation of the scanner deflection coils by the trainer heading servo 138.

Figure 5B:
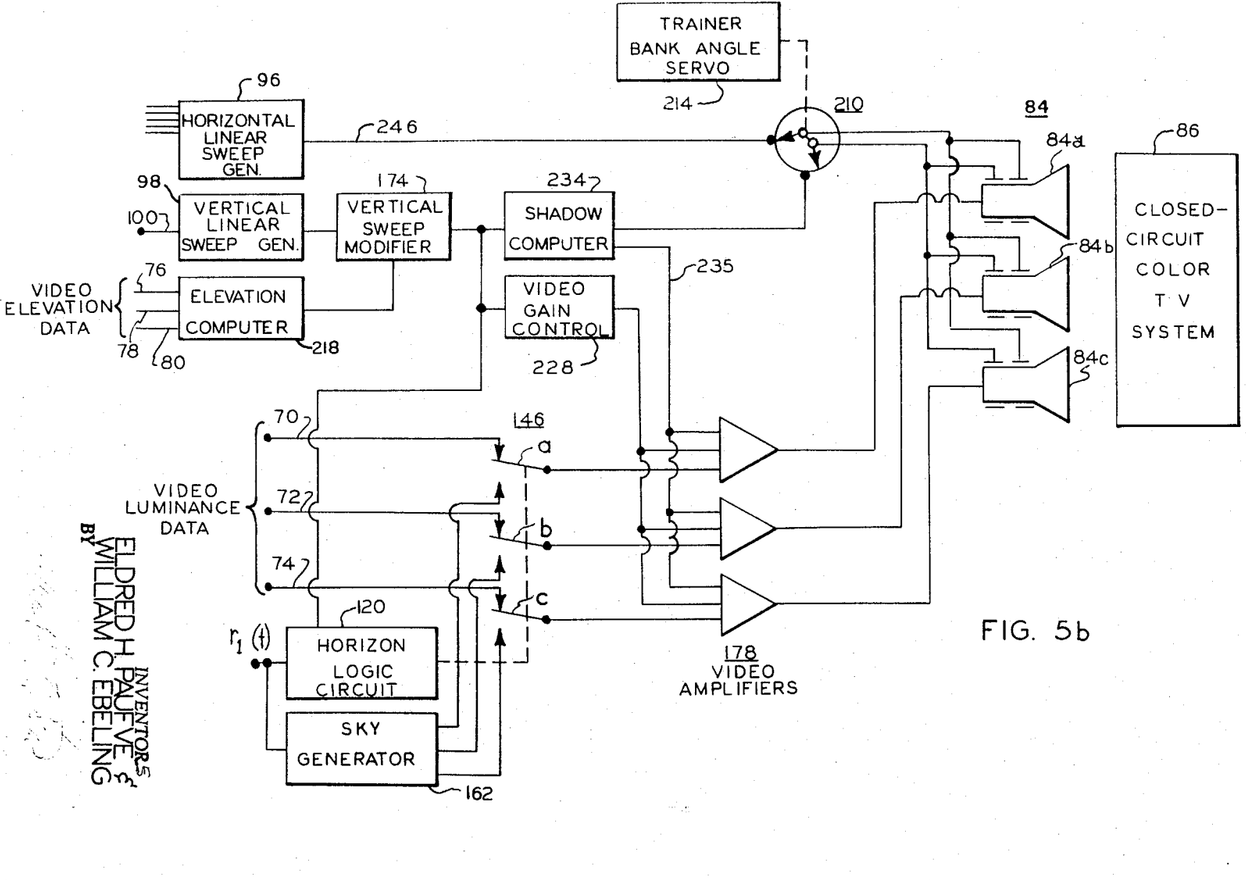
FIG. 5b is an electrical schematic diagram illustrating exemplary forms of luminance data-processing circuits and elevation data-processing circuits which may be used in the invention.

The luminance video processing circuits of FIG. 4 are shown in greater detail in the lower half of FIG. 5b, and the elevation video processing circuits 69 are shown in the upper half of FIG. 5b. The three video luminance signals on lines 70, 72 and 74 are routed as shown through a plurality of video switches 146 shown for sake of clarity as simple mechanical switches, and then through a plurality of video amplifiers shown at 178 to the intensity grid circuits of three electrostatically-deflected cathode ray tubes 84a, 84b, 84c, which serve as intermediate display tubes. Cathode ray tubes 84a, 84b and 84c are each viewed by a respective one of the three vidicon tubes (not shown) of the conventional closed-circuit color television system 86, and the display tube of system 86 provides the final display.

The intermediate display cathode-ray tubes 84a–c are provided with a fast vertical sweep at the same repetition rate as the r sweep of the flying spot scanner, i.e., at the pulse rate of clock 90, and provided with a slower horizontal sweep. While successive vertical sweeps of the intermediate display tubes 84 occur regularly at the repetition rate of clock 90, the speed of each electron beam during a given vertical trace is varied in accordance with the video elevation information derived on lines 76, 78 and 80 from elevation transparency 32. As shown in FIG. 5b, the clock signals on line 100 from clock 90 are applied to repetitively reset vertical linear sweep generator 98, which may comprise any one of a number of well-known ramp function or sawtooth generators. The linear ramp output waveform from sweep generator 98 is applied to vertical sweep modifier 174, one form of which is described in detail below in connection with FIG. 7. The function of sweep modifier 174 is essentially that of a multiplier, serving to multiply the linear ramp by the function $$\left(1 - \frac{h}{a}\right)$$

for the reasons discussed above in connection with Equation 9. The three video elevation signals on lines 76, 78, 80 are shown applied to elevation computer 218. The function of elevation computer 218 is to receive the three video signals on lines 76, 78 and 80 and to provide a signal commensurate with the elevation h of the terrain being scanned at any instant. If the elevation signal is provided in digital form, the vertical sweep modifier or multipler 174 may take the form shown in FIG. 7, and in such an embodiment elevation computer 218 will comprise a simple analog-to-digital converter. While each of the three video signals on lines 76, 78 and 80 is analog in form, it will be recalled that each was derived from a discrete shade of a particular color on elevation transparency 32. A simple analog-digital converter comprising three threshold circuits may serve to reencode each of the three video elevation signals to provide a parallel digital signal commensurate with elevation above sea level of the spot of terrain being scanned at any instant. In many embodiments of the invention elevation computer 218 may comprise instead a simple summing amplifier having appropriately scaled input circuits to provide an analog output signal commensurate with the elevation, and a fast analog multiplier, such as a diode "quarter-squares" multiplier, may be used in lieu of the "digital-times-analog" multiplier 174. In either arrangement it will be apparent that the multiplier must have sufficient bandwidth to handle the video elevation data. The output signal from sweep modifier 174 is routed through shadow computer 84 and resolver 210 to the vertical deflection plates of the three intermediate display cathode-ray tubes. Shadow computer 234, which is further explained below, operates to terminate the vertical sweep applied to the intermediate display tubes when the terrain being scanned at any given instant has a change in elevation such that the terrain could not be seen by an observer located at the instantaneous simulated aircraft altitude.

Resolver 210 is positioned by the trainer bank angle servo 214 and operates to proportion the components of the horizontal and processed vertical sweep voltages to the intermediate display tube deflection systems, thereby serving to rotate the images on the intermediate display tubes as simulated bank angle changes.

As shown in FIG. 5b, a parallel digital signal from counter 102 (FIG. 5a) is applied to horizontal linear sweep generator 96, which provides a staircase output signal on line 246, which signal varies in accordance with the digital count in counter 102. In some embodiments of the invention an ordinary sawtooth generator reset and triggered by the recycling of counter 102 may be substituted. The output signal from horizontal sweep generator 96 is applied via resolver 210 to the horizontal deflection circuits of the intermediate display cathode ray tubes 84a, 84b and 84c.

The speed of a given vertical sweep applied to the intermediate display tubes varies in accordance with terrain elevation changes, as described above, and such variation in speed if not compensated for, would provide an undesired intensity variation in the final display. In order to prevent such intensity variations, the vertical sweep waveform from vertical sweep modifier 174 is applied through video gain control circuit 228 to control the gain of each of the video amplifiers 178, in order to decrease the amplifier gain as sweep rate decreases and to increase the gain as sweep rate increases. Gain control 228 is merely a time derivative circuit to derive the time rate-of-change of the vertical sweep voltage from modifier 174 i.e., the sweep velocity, with a nonlinear function generator which approximately matches the display tube intensity characteristics to the control signal from sweep modifier 174. Proper gain control for preventing such undesired intensity variations only requires analog multiplication of each video signal by sweep velocity. A pair of logarithmic video amplifiers (not shown) for each color video signal may be fed a luminance video signal and a sweep velocity signal, respectively, with the two amplifier outputs summed and applied to an analog amplifier to provide the desired product signal. The sweep velocity signal may be obtained by differentiating the sweep modifier 174 output signal with any one of a number of well-known video differentiating circuits. This form of intensity compensation also may be used to provide display tube "gamma" correction by scaling the mentioned summing circuit to provide a gain of one-half so as to provide a video output signal varying approximately with the square root of the product of the video signal and the sweep velocity signal.

In order to provide a realistic display, the backs of hills, mountains and the like which are not visible from a given observer altitude and position must be blanked out, and terrain which is obscured by such hills and mountains also must be blanked out. In FIG. 2 for example, the terrain portion shown shaded at 232 is not visible to the observer, and the video signals derived by the flying spot scanner between points 15 and 17 on the luminance transparency must not be displayed. To prevent the display of these video signals, shadow computer 234 halts the vertical sweep applied to the scan converter tubes and cuts off video amplifiers 178 during the time when the FSS is scanning between points 15 and 17. In FIG. 2 it will be seen that if the observer at point 12 scans the terrain, beginning at point 15'' and progressing rightwardly, the angle $\theta$ between the horizon and a straight line of sight connecting point 12 to the terrain decreases until point 15 is reached, and further decreases to the right of point 17, but that the angle to the obscured terrain portion 232 is greater than the value of the angle at point 15. The value of the angle $\theta$ will be seen from FIG. 2 to be as follows:

$$\tan \theta = \frac{a-h}{r_0+r(t)} \qquad (10)$$

The modified sweep waveform output from modifier 174 will be understood from Equation 9 to be directly proportional to tan $\theta$. In the apparatus of FIG. 5b, the modified sweep waveform from sweep modifier 174 is applied to a negative peak detector and gating circuit (not shown) within shadow computer 234. So long as tan $\theta$ decreases during a given sweep, shadow computer 234 passes the modified sweep waveform to the intermediate display tubes, but if the value of tan $\theta$ increases above a previous low value which it reached during the sweep, shadow computer 234 interrupts the application of the sweep waveform to the intermediate display tubes until tan $\theta$ again decreases below the previous low value attained during the sweep. As well as interrupting application of the sweep waveform to the intermediate display tubes, shadow computer 234 also provides a control signal on line 235 to video amplifiers 178, to blank off the video generated by the FSS during scanning of the obscured portion of terrain. Because the details of shadow computer 234 are not a part of the present invention, and because a similar shadow computer is shown in detail in U.S. Patent No. 3,067,526 for blanking simulated radar signals, no further detailed description of shadow computer 234 is necessary.

It will be appreciated that, as thus far described, the only video signals provided to the intermediate display tubes represented ground terrain, and that a realistic display also requires provision of a horizon and a sky. In accordance with the invention, the terrain luminance video signals from the FSS are disconnected during each vertical sweep when the sweep reaches a value representing a level at which ground ends and sky begins, and artificially generated sky video signals are thereafter substituted for the remainder of the vertical sweep. The output signal from vertical sweep modifier 174 comprises the signal $$(y_0-kt)\left(1-\frac{h}{a}\right)$$

This signal is applied, together with the $r_1(t)$ signal from r sweep generator 88, to horizon logic circuit 120, which comprises a simple comparator circuit. During each vertical sweep, the scaled value of $r_1(t)$ signal will be less than the scaled value of the sweep modifier output signal so long as the FSS is scanning terrain, but as the value of $r_1(t)$ reaches a selected value deemed to represent the far limit of vision, the $$(y_0-kt)\left(1-\frac{h}{a}\right)$$

$r_1(t)$ signal will exceed the sweep modifier output signal, thereby providing an output signal from horizon logic circuit 120. The output signal from circuit 120 operates a plurality of single-pole double-throw electronic switches 146a-c, which are shown for clarity as simple mechanical switches and which substitute the sky video from sky generator 62 for the terrain luminance video theretofore applied to the intermediate display tubes. Sky generator 162 may comprise merely three simple function generators (such as diode function generators) which receive the $r_1(t)$ exponentially-increasing waveforms and which provide output signals representing the amounts of three primary colors in the sky, preferably providing an all-white coloration near the horizon and thereafter darkening to a light blue. Though not shown in FIG. 5b, the $r_1(t)$ signal also may be applied to video amplifiers 178 to reduce the video contrast ratio, i.e., the amplifier gain, in order to simulate fog, through a variable scaling impedance to allow simulated fog density to be varied.

The random sweep computer circuit shown in FIG. 6 receives a variable input signal commensurate with instantaneous simulated altitude $a$ and provides the recurrent, exponentially-increasing signals required to drive flying spot scanner 24. The output signal $r_1(t)$ required from the range computer was shown above in connection with Equation 8 to be as follows:

$$r_1(t) = r_0 + r(t) = \frac{ad}{y_0} + r(t)$$

In a given installation both the distance $d$ from the observer's viewpoint to screen 14, and $y_0$, the distance from horizon to the lower edge of the display, are fixed, and a constant potential commensurate with the ratio $d/y_0$ is applied to excite potentiometer 284, the arm of which is positioned in accordance with simulated altitude $a$ by a conventional simulator altitude servo, thereby providing an input signal commensurate with $ad/y_0$ to summing amplifier 264 via scaling resistor 288. The $r(t)$ portion of $r_1(t)$ is computed by the remainder of the FIG. 6 circuitry, as will be explained, and applied to amplifier 264 via scaling resistor 280.

The $ad/y_0$ potential on the arm of potentiometer 284 is also applied via scaling resistor 286 (having a value $y_0/d$) to a summing junction 272, providing an input commensurate with a $(d/y_0)^2$. An output signal from feedback amplifier 262 proportional to $r(t)$ is applied via scaling resistor 270 to provide an input to summing junction 272 commensurate with $2(d/y_0)r(t)$. A further signal proportional to $r(t)$ taken from the output of integrator 260 is applied via resistor 278 to a conventional squaring circuit 266, the output of which is varied inversely in accordance with altitude by potentiometer 282 operated by the altitude servo, thereby providing an input to summing junction 272 commensurate with $1/ar^2(t)$. The three input quantities applied to summing junction 272 will be seen to correspond to the three quantities under the integral sign in Expression 8. Integrator 260 sums and integrates the three quantities with respect to time, providing an output signal which is inverted by feedback amplifier 262 to provide proper polarity signals. The output signal proportional to the integral of Equation 8 from amplifier 262 is scaled in accordance with the $k/d$ multiplier by scaling resistance 280 and applied as a further input to summing amplifier 264. Each clock pulse applied to line 112 resets integrator 260, after which the system proceeds through another solution of Equation 8. The circuit shown in FIG. 6 is only one of a number of circuits which may be used to provide the exponentially-increasing waveform $r_1(t)$.

Figure 7:
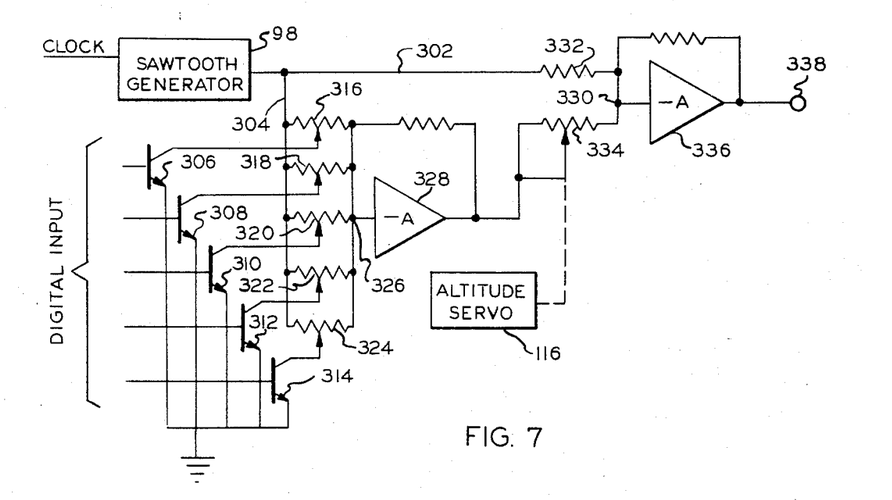
FIG. 7 is an electrical schematic diagram illustrating one form of sweep modifier which may be used in connection with the invention.

One form of circuit for the vertical sweep modifier 174 is shown in greater detail in FIG. 7. Linear sweep generator 98 comprises a simple linear sawtooth generator which is reset by clock pulses from source 90, so that generator 98 provides a repetitive $(y_0-kt)$ waveform. This waveform is applied via a plurality of scaling resistors to summing junction 326 of a feedback amplifier 328. Each scaling resistor is connected to be switched by application of a positive voltage to the base of a respective one of associated NPN transistors 306, 308, 310, 312, 314. The scaling resistors are proportioned in accordance with the bit significance of the various bits of the digital number applied to sweep modifier 174 from digitizer 218, and hence it will be seen that an output voltage varying in accordance with the product of the $(y_0-kt)$ analog function and the digital number $h$ will appear at the output of amplifier 328. The amplifier 328 output voltage is applied to a conventional servo-driven potentiometer 334 to provide an input current to amplifier 336. The resistance of potentiometer 334 is varied by the trainer altitude servo directly in accordance with altitude $a$, so that the input current to amplifier 336 via potentiometer 334 is commensurate with $(y_0-kt)h/a$. The waveform $(y_0-kt)$ on line 302 is also applied to amplifier 336 via scaling resistor 332. It may be seen that the output signal from summing amplifier 336 will be $$(y_0-kt) - (y_0-kt)\frac{h}{a}$$

or $$(y_0-kt)\left(1-\frac{h}{a}\right)$$

which is the desired vertical sweep quantity discussed in connection with Equation 9.

It will be readily apparent that the $m$ sweep modifier of FIG. 5a may comprise a digital-analog multiplier of the same type as that shown in FIG. 7.

Figure 8:
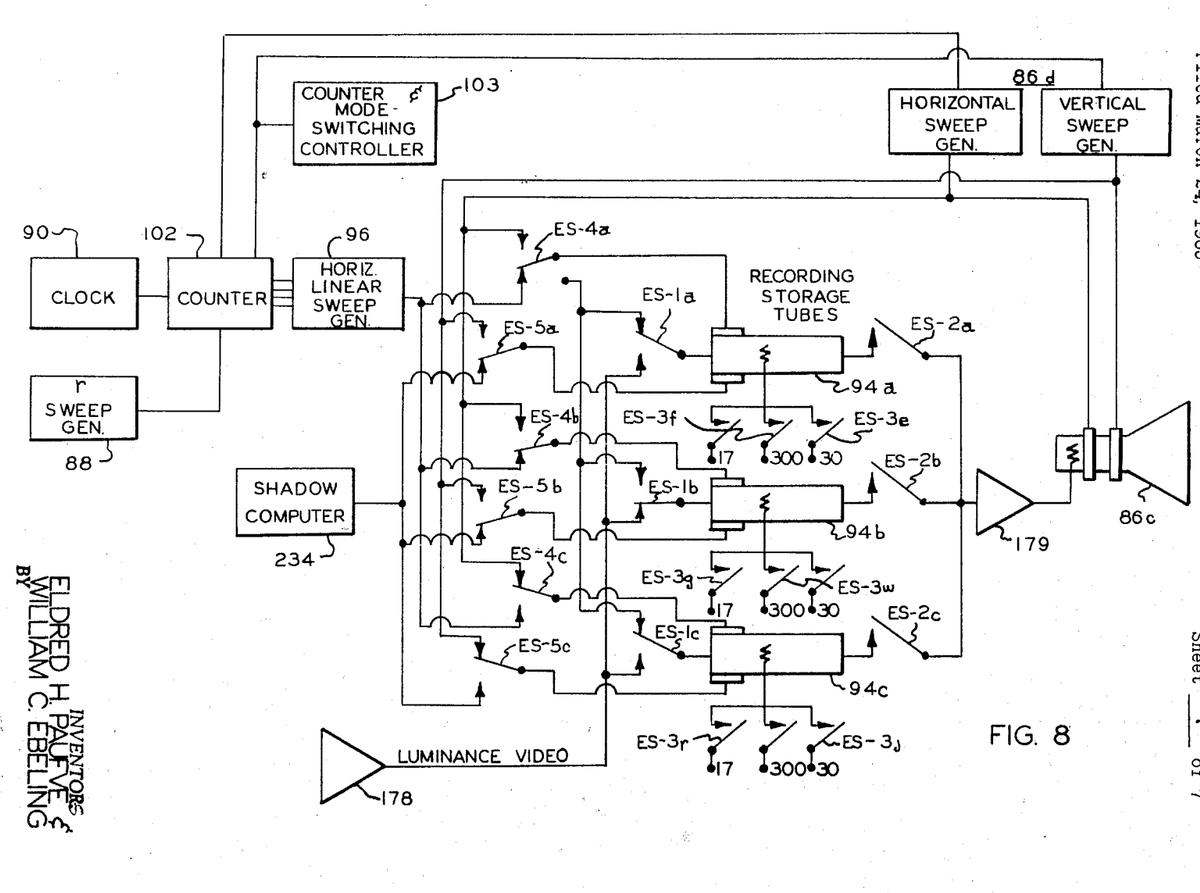

As mentioned above, one alternative embodiment of the invention utilizes recording storage or scan conversion tubes in lieu of the intermediate display cathode-ray tubes 84a–c of FIG. 5b, with each video luminance signal multiplexed between a plurality of tubes. FIG. 8 shows a portion of such a system. In FIG. 8 only one video luminance channel is shown for a monochrome system, but it will be apparent that two similar channels may be added for a color display. In FIG. 8 a number of electronic switches are shown as simple mechanical switches for convenience and clarity.

The recording storage tubes of FIG. 8 (which may comprise Raytheon Type CK 6835/QK464A) operate in three modes: "write," "read," and "erase," in which video signals may be written into such a tube to be stored for as long as several seconds, read out as many times as desired, and then erased. In the system shown in FIG. 8, the three scan conversion tubes 94a–c are repetitively cycled through the three modes, with one tube in each of the three modes at a given time. With the switch positions shown in FIG. 8, tube 94a is being erased, tube 94b is being written into, and tube 94c is being read out. The video luminance signal from amplifier 178 is applied to storage tube 94b shown being written into via switch ES–1b. Because tubes 94a and 94c are in their "erase" and "read" modes, respectively, switches ES–1a and ES–1c leading to their input signal terminals are disconnected from the luminance video signal. The output signal from tube 94c shown being read out is applied via read-out switch ES–2c and conventional video amplification 179 to the intensity grid circuit of the final display cathode ray tube 86c. Because tubes 94a and 94b are in their "erase" and "write" modes, respectively, their associated read-out switches ES–2a and ES–2b are open. In order to operate the tubes in respective selected modes, selected voltages are applied to the storage screens of the tubes. Tube 94a is shown with an "erase" level potential of 30 volts applied to its storage screen via switch ES–3e, tube 94b is shown with a "write" level potential of 300 volts applied to its storage screen via switch ES–3w, and tube 94c is shown with a "read" level potential of 17 volts applied to its storage screen via switch ES–3r.

In the system of FIG. 8, the storage tube deflection circuits are driven by the horizontal and processed vertical sweep voltages from sweep generator 96 and shadow computer 234 during their "erase" and "write" modes, but by the horizontal and vertical sweep voltages of the final display CRT 86c during their "read" modes. In this manner a picture produced at a slow frame rate may be read a number of times to produce a flickerless output display. For example, the flying spot scanner may be driven with 20 slow or $m$ sweeps per second (from circuit 106, FIG. 5a) to provide 20 fields, or 10 interlaced frames per second, with the conventional output CRT 86c operating at 30 frames per second, so that the video written on each storage tube is read out three times before being erased. In FIG. 8, tubes 94a and 94b shown being erased and written into, respectively, have their horizontal deflection circuits driven by horizontal linear sweep generator 96 via switches ES–4a and ES–4b, and their vertical deflection circuits driven by the output from shadow computer 234 via switches ES–5a and ES–5b, while tube 94c shown being read has its horizontal and vertical deflection circuits driven by the horizontal and vertical sweep system 86d associated with output display cathode-ray tube 86c, through switches ES–4c and ES–5c.

To provide a 525-line interlaced output display at 30 frames per second, conventional output CRT 86c may use a vertical sweep of 60 c.p.s. and a horizontal sweep of 15,750 c.p.s., and to provide a 1050-line interlaced trapezoidal raster at 10 frames per second, the reset signal applied to $r$ sweep generator 88 may be at a 10,500 cycle rate. The oscillator in clock 90 may oscillate at 31,500 c.p.s., with every second count being applied from counter 102 to synchronize the output display horizontal sweep, and with every third count being applied to reset $r$ sweep generator 88. Counter 102 may comprise an eleven-stage binary counter connected to count up to 1575 and then recycle. Every 525 counts, or three times during each frame of the FSS, an output signal from counter 102 is applied to trigger the vertical sweep generator of the output display tube 86c to provide the 60 c.p.s. vertical sweep. This same output signal is applied to a simple counter 103, which recycles through a count of three. During the "1" condition of counter 103, all of the electronic switches of FIG. 8 may be in the conditions illustrated in FIG. 8. During the "2" and "3" count conditions, tubes 94a, 94b and 94c may be reconnected first to their "write," "read" and "erase" modes, respectively, and then to their "read," "erase" and "write" modes, respectively. While FIG. 8 illustrates a storage tube system wherein three separate storage tube modes are used, so that three storage tubes are required for a single video color, various storage tubes capable of simultaneous writing and reading are available and may be used, thereby requiring fewer storage tubes.

To provide the final display to the observer with proper attitude angles, the Euler (attitude) angles of the simulated aircraft may be connected to vary the display. As previously mentioned, heading changes are introduced by rotation of the magnetic deflection yoke of flying spot scanner 24 to determine the angular sector through which the $m$ sweep operates, and because the scanner tube deflection is intentionally offset from the center of the tube, compensating inputs commensurate with heading components are applied to the film drive servos 130 and 132. It is theoretically possible but unnecessarily complex to incorporate bank angle changes into the map scanning performed by the FSS, and therefore, bank angle is readily introduced at the output end of the system merely by rotation of the deflection system of the cathode ray tube (or tubes) used to display the video. The use of resolver 210 to rotate the images in the three electrostatic intermediate-display cathode-ray tubes 84a, 84b and 84c is shown in FIG. 5b. Where scan converter tubes are used to provide the intermediate display, bank angle changes may be introduced simply by merely rotating the scan converter tube deflection system when information is read out of the scan converter tube. In the apparatus of FIG. 8, the trainer bank angle servo may be similarly connected to position a resolver (not shown) to resolve components of the closed-circuit TV horizontal and vertical sweeps to the vertical and horizontal deflection plates of those scan converter tubes being read out at any instant. With zero bank angle, the television system 86 horizontal sweep preferably drives the scan converter vertical readout sweep, and vice versa. If desired, the resolver driven by the bank angle servo could be used to rotate the TV system 86 (at either its vidicons or its projector) instead of rotating the intermediate display, irrespective of whether scan converter tubes or ordinary cathode ray tubes are used to produce the intermediate display.

Pitch angle changes sometimes have a somewhat more complex effect. If the final display is projected on to a stationary screen viewed by observer's in a simulator cockpit which itself pitches in accordance with simulated pitch angle, no correction need be made in the projected display as simulated pitch angle varies, although extreme pitch angles would result, of course, in the edges of the projected display coming into view. On the other hand, if the final display is projected on the cockpit window through an optical system which is fixed relative to the window, it will be seen that the picture content must change as pitch angle varies in order to provide a wholly realistic presentation. The basic computations derived in connection with FIGS. 1 and 2 assumed that screen 14 on which the final display was assumed to be projected was vertical with respect to the earth, and with the cockpit, its window and the projection system all pitched, it will be appreciated that the equations heretofore set forth would not be wholly accurate. For many applications however, and especially simulation of high speed aircraft at fairly low altitudes, the errors are not serious because pitch angle usually remains small. If the projected display is made somewhat larger than the cockpit window, pitch angle changes may be simulated effectively merely by shifting the final display up and down in accordance with pitch angle, using the trainer pitch angle servo to adjust the "vertical position" control on the closed circuit TV projector, for example. Such compensation for pitch angle variations is not theoretically rigorous and wholly accurate, but it results in only about a 2% error in vertical scaling accuracy for pitch angle changes as great at 10 degrees and is wholly satisfactory for most applications.

It is possible, though seldom economically justifiable, to more accurately introduce the effects of pitch angle changes by the use of somewhat more complex computations. For example, Equations 7 and 8 governing $r_1(t)$ may be revised to the following form:

$$r_1(t) = r_0 + \frac{ad \cos^2}{y_0 + d \tan \alpha} - a \tan \alpha$$

wherein $\alpha$ is pitch angle.

Because pitch angle changes also result in scale factor changes in the lateral direction, the lateral component $l$ of the $m$ sweep in such a system is no longer directly proportional to $r$, but instead proportional to $$r/d \cos \alpha + a/d \sin \alpha$$

Mechanization to provide these modifications may be done in accordance with straightforward techniques which will be apparent as a result of this disclosure and need not be further described in detail. The equations developed in connection with FIGS. 1 and 2 assuming screen 14 to be vertical, may be modified to assume that screen 14 is pitched at various angles. Such modified systems would be useful for simulating terrain as viewed through open bomb-bay doors, for example.

Figure 9:
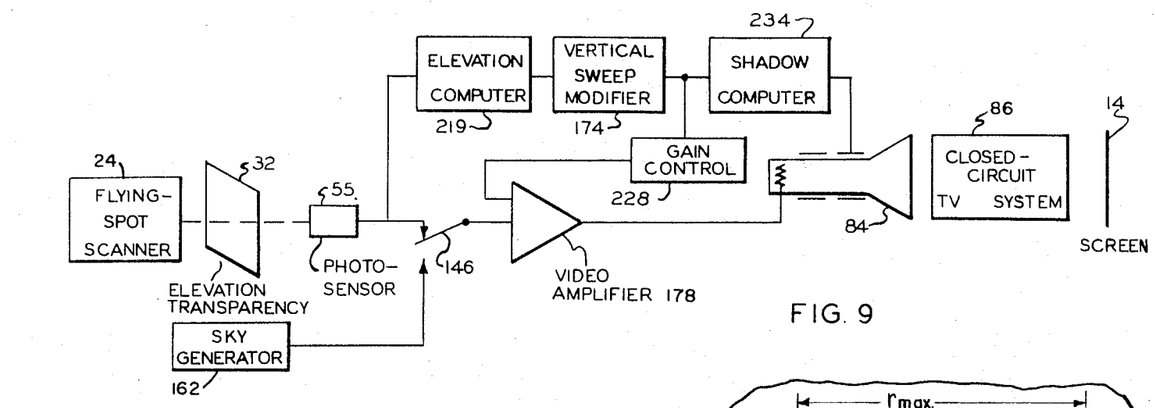
FIG. 9 is a block diagram of portions of a simplified embodiment of the invention utilizing a single video signal for both luminance and elevation indication.

As mentioned above, in one very simplified embodiment of the invention, only an elevation transparency is used to produce a terrain image which does not portray any vegetation, culture features or water body information but which does present a well-simulated representation of terrain with variations in image brightness. Portions of such a system are illustrated in FIG. 9 wherein a flying-spot scanner scans only an elevation transparency 32 to provide a video signal from photosensor 55. If elevation transparency 32 is monochrome and only a single photosensor is used the number of elevations in the display produced will be limited to the number of shades of the color (to which photosensor 55 is responsive) which can be coded on transparency 32. It will be apparent that additional colors may be encoded on film 32 and sensed by plural photosensors as shown in FIG. 4 to provide more elevation information. Whether derived by one or plural photosensors, the video signal representing elevation data is applied not only to elevation computer 219 and vertical sweep modifier 174, eventually to vary the intermediate display sweep velocity, just as was done in FIG. 5b, but also applied in lieu of a luminance signal to vary the beam intensity of the intermediate display tube 84. Switch 146 again represents an electronic switch used to substitute an artificially-generated "sky" signal. Though not shown in FIG. 9, it will be appreciated that a horizontal sweep is applied to tube 84 from a sweep generator similar to generator 96 of FIG. 5b, that a blanking output from shadow computer 234 may be applied to video amplifier 178 in FIG. 5b, and that a horizon logic circuit may be provided to control switch 146. With elevation information controlling intermediate display tube intensity it will be seen that the display produced will show higher terrain as lighter terrain (or as darker terrain, if desired). An even more simplified embodiment which provides equivalent operation, does not require that any video data be applied to the display tube intensity grid circuit. If a constant potential is applied to the tube 84 intensity grid circuit, and gain control 228 is eliminated, the variation in sweep velocity with elevation will automatically cause a variation in intensity, with higher elevations being shown lighter than lower elevations.

Figure 10:
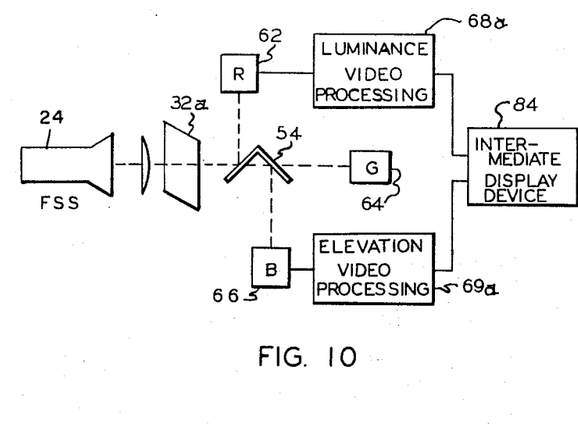
FIG. 10 is a block diagram illustrating a further embodiment of the invention in which different luminance and elevation data is extracted from the same film transparency.

FIG. 10 illustrates portions of a further embodiment of the invention in which both elevation and luminance are derived from the scanning of a single transparency on which luminance data is encoded as gradations on one color and elevation data is encoded as gradations of another color. It will be apparent at this point that a further color may be used on the film to encode either the luminance data or the elevation data with improved resolution. In FIG. 10 film 32a is assumed to have luminance information encoded in shades of red and to have elevation information encoded in shades of blue. The red reflected from dichroic mirror 54 and sensed by photosensor 62 is applied to the luminance video processing circuits 68a, which may take the form of the similar circuits shown in the lower portion of FIG. 5b. The blue reflected by mirror 54 and sensed by photosensor 66 is applied to elevation video processing circuits 69a similar to the circuits in the upper portion of FIG. 5b. As suggested, a third color (green) may be used on film 32a to encode a further "digit" of either luminance or elevation, and "green" photosensor 64 connected into either the luminance or the elevation processing circuits. It should be apparent at this point that the number of transparencies which one must use depends only upon the number of shades of each color one may satisfactorily encode on and read off a transparency, and the number of colors one may encode on and read off, with each detectable shade of each color representing a "bit" of information. It is within the scope of the invention to use two or more multicolored transparencies to provide even greater data resolution if desired. It will be apparent that the beam from the flying-spot scanner may be further split, so that it scans two elevation transparencies and an aerial photograph, and if elevation data is encoded on the two elevation transparencies with three colors on each transparency, it will be seen that elevation may be resolved with an accuracy of $jklmno$ digits, where $j$, $k$, $l$, $m$, $n$ and $o$ are the numbers of shades used of the various colors.

While the plates encoded with elevation and luminance data have been shown as comprising films or glass-plate transparencies through which light is transmitted, and while coded records of transparent (or more properly translucent) type are probably most suitable for most embodiments of the invention, flying-spot scanners which utilize reflected rather than transmitted light are well known, and it is within the scope of the invention to use records which reflect rather than transmit.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Visual display apparatus, comprising, in combination:
   data map means having terrain luminance and terrain elevation data encoded thereon;
   scanning means for scanning said data map means to provide first and second video signals representing luminance and elevation, respectively, of portions of said data map means being scanned at a given instant;
   a video image display device having an intensity signal input circuit and first and second deflection circuits;
   first circuit means connecting said first video signal to said intensity signal input circuit;
   sweep generator means for applying first and second sweep waveforms to said first and second deflection circuits, respectively;
   and means having said second video signal connected to an input thereof for varying one of said sweep waveforms.

2. Apparatus according to claim 1 in which said video image display device comprises a cathode-ray tube having a phosphorescent screen, and in which said apparatus includes a closed-circuit television camera and display system, said television camera being arranged to view said phosphorescent screen.

3. Apparatus according to claim 1 in which said video image display device comprises a cathode-ray recording storage tube, and in which said apparatus includes a cathode-ray display tube connected to display a video image read out of said recording storage tube.

4. Visual display apparatus, comprising, in combination:
   data map means having terrain luminance and terrain elevation data encoded thereon;
   sweep generator means for generating repetitive first and second sweep signals of first and second time functions;
   scanning means having first and second deflection means driven by first and second sweep signals for scanning said data map means to provide a first video signal representing the luminance of the portion of said data map means being scanned at a given instant and to provide a second video signal representing the instantaneous elevation of said portion;
   a cathode-ray display tube having an intensity signal input circuit and first and second deflection circuits;
   first circuit means connecting said first sweep function signal to the first deflection circuit of said display tube; second circuit means connecting said first video signal to said intensity signal input circuit;
   means having said second video signal connected to an input thereof for modifying said first sweep signal commensurate with the product of said second time function and said instantaneous elevation;
   and third circuit means connecting said modified sweep signal to said second deflection circuit of said display tube.

5. Apparatus according to claim 4 in which said data map means comprises first and second transparency maps, said first map comprising a rectified aerial photograph and said second map having elevation data encoded thereon in terms of a plurality of shades of a plurality of colors.

6. Apparatus according to claim 4 in which said first time function is linear and said second time function is exponential.

7. Apparatus according to claim 4 in which said scanning means comprises a cathode-ray tube flying-spot scanner and photosensor means.

8. Apparatus according to claim 4 in which said second circuit means includes electronic switching means responsive to said modified sweep signal and said second sweep function signal for disconnecting said first video signal from said intensity signal input circuit when either said modified sweep signal or said second sweep function signal exceed selected values.

9. Apparatus according to claim 4 in which said second circuit means includes video amplifier means; and in which said apparatus includes means for time-differentiating said modified sweep signal to provide a modified sweep velocity signal, and means connecting said modified sweep velocity signal to control the gain of said video amplifier means.

10. Apparatus according to claim 4 in which said third circuit means includes peak detector means for continuously determining the maximum value in one direction reached by said modified sweep signal during each cycle of said modified sweep signal and for disconnecting said modified sweep signal from said second deflection circuit of said display tube and for providing a blanking signal during any excursion of said modified sweep signal below the maximum value theretofore reached by said modified sweep signal during said cycle, said blanking signal being connected to said second circuit means to interrupt application of said first video signal to said intensity signal input circuit.

11. Apparatus according to claim 4 in which said first and third circuit means include resolver means connected to said deflection circuits of said display tube and operable to rotate the image formed on said display tube.

12. Visual display apparatus, comprising, in combination:
   a data map means having terrain luminance and terrain elevation data encoded thereon; scanning means for scanning said data map means with a scanning raster comprising a pattern of lines which intersect at a point to provide a first video signal representing the luminance of the portion of said data map means being scanned at a given instant and to provide a second video signal representing the instantaneous elevation to said portion;
   a cathode-ray display tube having an intensity signal input circuit and first and second deflection circuits;
   first circuit means for applying said first video signal to said intensity signal input circuit; means for generating first and second sweep signals for said first and second deflection circuits; and means having said second video signal connected to an input thereof for modifying one of said sweep signals.

13. Visual display apparatus, comprising, in combination:
   data map means having terrain elevation data encoded thereon;
   scanning means for scanning said data map means to provide a video signal;
   a cathode-ray beam device having an intensity signal input circuit and first and second deflection circuits;
   first circuit means connecting said video signal to said intensity signal input circuit; sweep generator means for deriving first and second sweep signals; and means having said video signal connected to an input thereof for modifying one of said sweep signals in accordance with the instantaneous value of said video signal.

14. Visual display apparatus, comprising, in combination:
   data map means having terrain elevation data encoded thereon;
   scanning means for scanning said data map means to provide a video signal;
   a video image device having an electron beam, an electron-receiving surface, and first and second deflection circuits;

sweep generator means for applying first and second waveforms to said first and second deflection circuits, respectively;

and means having said video signal connected to an input thereof for varying one of said sweep waveforms to vary the sweep velocity of said electron beam and thereby vary the intensity of the charge applied to said electron-receiving surface by said electron beam.

15. A visual display device comprising in combination, a photographic transparency having terrain elevation data encoded thereon in the form of density variations;

electronic means for viewing a portion of said transparency to derive an electrical waveform corresponding to the density variations of said encoded data within said portion;

a display device including an intensity-controlling input terminal and first and second deflection circuits;

first and second sweep circuit means;

means coupling said electrical waveform to said intensity controlling input terminal and the output of said first and second sweep circuit means to said first and second deflection circuits, respectively; and means having said electrical waveform connected to an input thereof for modifying the output of one of said sweep circuits in accordance with said density variations of said data encoded within said portion viewed by said electronic means.

16. A visual display device comprising in combination, a film transparency having encoded thereon density variations representative of terrain elevation;

means for converting said density variations into a video waveform representative of said terrain elevation;

a display device including first and second sweep generators for presenting a display to an observer;

circuit means coupling said video waveform to said display device; and means having said video waveform connected to an input thereof for modifying the output of one of said sweep generators as a function of said video waveform.

17. A visual display apparatus comprising in combination, first and second map means, said first map means being encoded with luminous data representative of the terrain to be viewed by an observer and said second map means being encoded with elevational data corresponding to the said terrain;

means for converting predetermined portions of the data encoded on said first and second map means into first and second electrical waveforms;

a cathode-ray-tube display tube having an intensity signal input circuit and first and second deflection circuits associated therewith;

first and second sweep generators;

circuit means coupling said first electrical waveform to said intensity signal input circuit and said first and second sweep generators to said first and second deflection circuits, respectively; and means having said second electrical waveform connected to an input thereof for modifying the output of said first sweep generator to provide a three dimensional perspective display.

References Cited

UNITED STATES PATENTS

| | | | |
|---|---|---|---|
| 3,028,684 | 4/1962 | Khanna et al. | 35—10.4 |
| 3,067,526 | 12/1962 | Gray et al. | 35—10.4 |
| 3,113,989 | 12/1963 | Gray et al. | 35—10.4 |
| 3,131,247 | 4/1964 | Benamy et al. | 35—10.4 |
| 3,153,699 | 10/1964 | Plass | 178—6.8 |
| 3,294,891 | 12/1966 | Antul et al. | 35—10.4 |

MALCOLM A. MORRISON, *Primary Examiner.*

R. W. WEIG, *Assistant Examiner.*

U.S. Cl. X.R.

35—10.4; 12